Dec. 14, 1926.
R. S. SANFORD
ROAD SIGHTING INSTRUMENT
Filed April 9, 1926   2 Sheets-Sheet 1
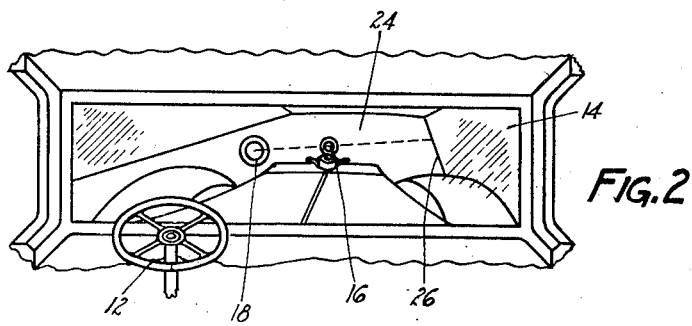
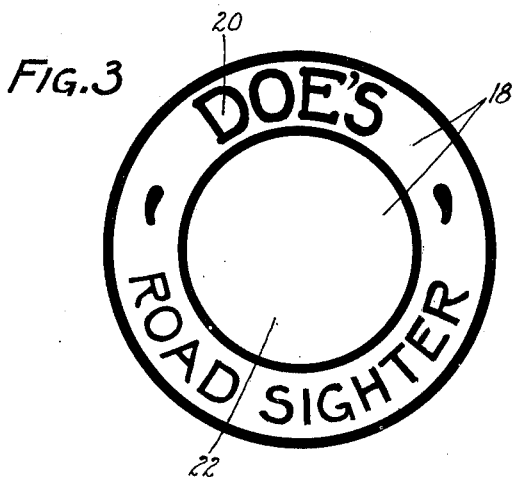
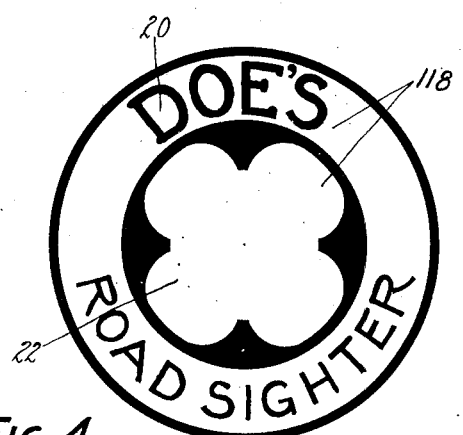
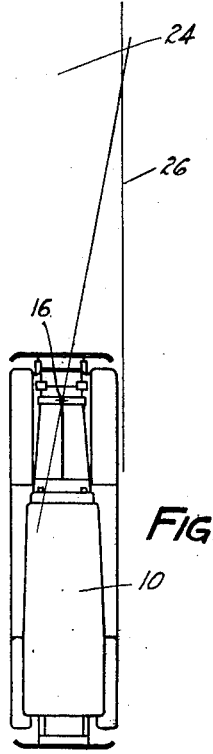
INVENTOR
ROY S. SANFORD
BY
ATTORNEY Dec. 14, 1926.
R. S. SANFORD
ROAD SIGHTING INSTRUMENT
Filed April 9, 1926    2 Sheets-Sheet 2
1,610,477
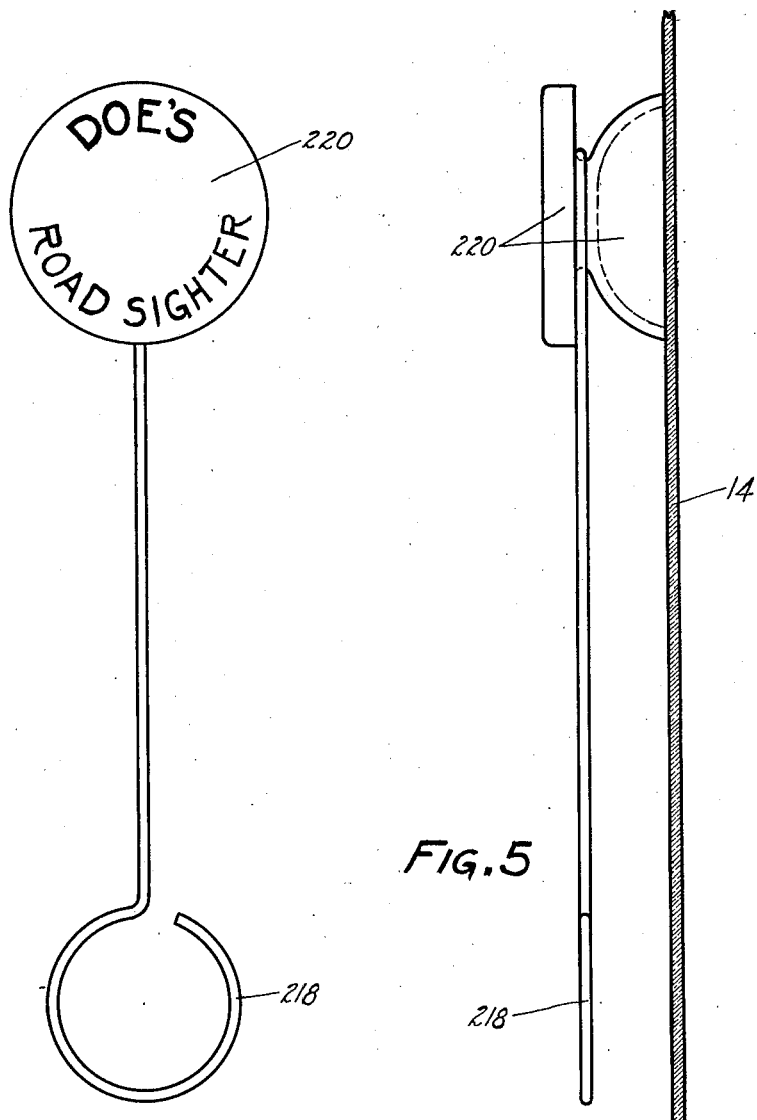
INVENTOR
Roy S. Sanford
BY
ATTORNEY Patented Dec. 14, 1926.

1,610,477

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

ROAD-SIGHTING INSTRUMENT.

Application filed April 9, 1926. Serial No. 100,915.

This invention relates to automobiles or similar dirigible vehicles, and is illustrated as embodied in an automobile having novel sighting devices so arranged that the driver may use them to determine how near his right wheels are to the edge of the road, thus permitting him to give a passing car as much room as possible without being forced into the ditch.

In one desirable arrangement there are two sighting devices, one of which may, if desired, be the radiator cap or motometer, and the other of which is illustrated as being an inexpensive paper or celluloid device adhesively secured to the windshield.

Whatever their form, the devices are so arranged that, when the driver sights over them (at least when on a reasonably straight road), his line of sight will intersect the road surface inside its right edge so long as his right wheels are on the road. Thus a glance along this line of sight will always tell him how near he is to the edge of the road.

The above and other objects and features of the invention will be apparent from the following description of one illustrative embodiment shown in the accompanying drawing, in which:

Figure 1 is a top plan view of the vehicle on a straight stretch of road;

Figure 2 is a view from the driver's seat of the windshield and the road in front;

Figure 3 is an enlarged view of the device on the windshield;

Figure 4 is a similar view of a sighting device of somewhat different form;

Figure 5 is a vertical section through part of the windshield, showing a different sighting device in side elevation; and Figure 6 is a rear elevation of the sighting device of Figure 5.

The vehicle selected for illustration is an automobile 10 having a steering wheel 12 and a windshield 14. The front sighting device may be a radiator cap or motometer 16, at the center of the front end of the car. The rear sighting device is shown in Figures 2—4 as a circular paper or celluloid device 18 (Figures 2 and 3) or 118 (Figure 4), which may have a translucent border 20 serving as an advertising medium, and an opening or transparent center through which passes the driver's line of vision.

In Figures 5 and 6, the rear sighting device is a loop of wire 218, which has practically no effect in obstructing the view, and which is supported by a vacuum cup 220, of rubber or the like, which adheres to the top of the windshield, and which is provided with advertising matter on its flat rear face.

The device 18 (or 118 or 218) is above and at the left of device 16, so that the line 18—16 intersects the road surface a considerable distance ahead of the car. Device 18 is secured to the windshield 14 when the car is arranged at the extreme right of a straight stretch of road 24, the right wheels either being exactly at the right edge 26 of the road, or having any desired predetermined spacing from the edge 26 to give a margin of safety. Device 18 is secured in place at such a point that the line 18—16 intersects the road surface exactly at edge 26.

Thereafter, the driver knows that he will not go off a reasonably straight stretch of road so long as his line of sight 18—16 intersects the road surface at the left of its right edge. When a passing car forces him over, he can readily tell with accuracy just how far over he can go without danger.

While one illustrative arrangement and embodiment has been described in detail, it is not my intention to limit the scope of the invention to that particular arrangement, or otherwise than by the terms of the appended claims.

I claim:

1. A motor vehicle having a windshield and comprising, in combination therewith, a sighting device carried on the windshield, and a second sighting device on the vehicle forwardly, on a lower level, and at the right of the first device whereby a driver may aline said sights with the edge of the road to position the vehicle a predetermined distance from such edge.

2. A motor vehicle having a windshield and a radiator cap forwardly of the windshield, and comprising, in combination therewith, a sighting device at the windshield above and at the left of the radiator cap, whereby a driver may aline the sighting device and the radiator cap with the edge of the road to position the vehicle a predetermined distance from such edge.

3. A motor vehicle having a windshield and a radiator with a cap, and comprising, in combination therewith, a sighting device supported at the top of the windshield and having a downwardly-extending portion so narrow as not to obstruct the driver's view and arranged at its lower end as a sighting device above and at the left of said cap, in such a position that the driver may aline the sighting device and the radiator cap with the edge of the road to position the vehicle a predetermined distance from such edge.

In testimony whereof, I have hereunto signed my name.

ROY S. SANFORD.